United States Patent [19]

Beausoleil

[11] Patent Number: 5,321,709
[45] Date of Patent: Jun. 14, 1994

[54] PULSED INTRACAVITY NONLINEAR OPTICAL FREQUENCY CONVERTER

[75] Inventor: Raymond G. Beausoleil, Redmond, Wash.

[73] Assignee: Cygnus Laser Corporation, Duvall, Wash.

[21] Appl. No.: 63,006

[22] Filed: May 17, 1993

[51] Int. Cl.$^5$ .............................................. H01S 3/10
[52] U.S. Cl. ...................................... 372/22; 372/21; 372/10; 372/94
[58] Field of Search ........................ 372/22, 21, 10, 94

[56] References Cited

U.S. PATENT DOCUMENTS

| | | | |
|---|---|---|---|
| 4,127,827 | 11/1978 | Barry | 372/22 |
| 4,176,327 | 11/1979 | Wayne et al. | 372/22 |
| 4,253,733 | 3/1981 | Krasinski et al. | 350/380 |
| 4,354,271 | 10/1982 | Hon | 372/19 |
| 4,413,342 | 11/1983 | Cohen et al. | 372/22 |
| 4,418,413 | 11/1983 | Hon | 372/89 |
| 4,617,666 | 10/1986 | Liu | 372/22 |
| 4,618,957 | 10/1986 | Liu | 372/22 |
| 4,637,026 | 1/1987 | Liu | 372/22 |
| 4,879,723 | 11/1989 | Dixon et al. | 372/21 |
| 4,909,595 | 3/1990 | Okazaki et al. | 385/123 |
| 4,961,195 | 10/1990 | Skupsky et al. | 372/31 |

FOREIGN PATENT DOCUMENTS

| | | | |
|---|---|---|---|
| 1-257922 | 10/1989 | Japan | G02F 1/37 |
| 2113905A | 8/1983 | United Kingdom | H018/3/094 |

Primary Examiner—Georgia Y. Epps

[57] ABSTRACT

A method for efficiently controlling sum frequency mixing and second harmonic generation within Q-switched laser oscillators. A nonlinear crystal is placed at either the intersection point of two otherwise independent laser oscillators (in the case of sum frequency mixing) or within a single laser resonator (in the case of second harmonic generator). During the build-up phase of the oscillator temporal development. (i.e., after the Q-switch has been opened but before the laser has reached threshold), a nonlinear optical crystal controlled by high voltage is employed to significantly reduce the efficiency of the frequency conversion process. In a preferred embodiment, the nonlinear optical crystal reduces the efficiency of the birefringent nonlinear optical process by spoiling the dephasing of the multi-wave interaction. After threshold has been reached in the resonant cavity, the conversion efficiency is increased at some desired rate. As a result, the extracted light at the converted frequency has one or more of a number of desirable properties, including: increased net conversion efficiency; reduced pulse-to-pulse temporal fluctuations (jitter); and/or a controlled temporal shape.

16 Claims, 7 Drawing Sheets

PULSED INTRACAVITY NONLINEAR OPTICAL FREQUENCY CONVERTER

FIELD OF THE INVENTION

The present invention generally relates to intracavity nonlinear optical frequency conversion within a Q-switched laser oscillator, and in particular, to apparatus and a method for controlling the harmonic electromagnetic field output by the laser oscillator.

BACKGROUND OF THE INVENTION

In a typical Q-switched laser system containing an intracavity nonlinear optical frequency converter, the strong fields generated within the resonator permit much higher single-pass conversion efficiencies than can be obtained by placing the crystal outside the resonator. For a low repetition rate, high power Q-switched laser, intracavity frequency conversion offers little real advantage over external conversion. However, in high repetition rate, high average power Q-switched systems (such as continuously pumped, acousto-optically Q-switched lasers), intracavity conversion represents a significant advantage. To date, any nonlinear optical crystal used for frequency conversion in such devices is a passive component, in the sense that the single-pass efficiency with which the crystal converts the frequency of the fundamental beam(s) to a harmonic frequency is determined by the laser's average and peak power levels. Small variations in the efficiency of the conversion process can be realized by adjusting the crystal orientation and temperature.

This passively coupled scheme has several disadvantages. During the time in which the laser field is building up from a noise floor to the laser oscillation threshold, the crystal is continuously converting a small fraction of the intracavity optical energy from its fundamental frequency to a higher harmonic frequency, and such energy conversion represents a loss that increases as the energy of the fundamental frequency increases. The loss reduces the peak efficiency of the conversion process, because it reduces the peak energy in the resonator.

Small fluctuations in both the energy stored in the laser medium prior to the opening of the Q-switch and the amplitude and phase of the noise level from which the oscillation begins cause greatly magnified variations in the time at which the laser system emits a coherent light pulse at the higher harmonic frequency. This "jitter" can cause significant timing problems in detection schemes that rely on the stability of the laser signal. Accordingly, it will be evident that precisely controlling the time at which a Q-switched laser emits a pulse of coherent light can substantially eliminate problems with jitter.

Nonlinear optical crystals are also used to mix the frequencies of two lasers that share a common portion of an internal optical path. When the frequencies of two lasers are mixed in a single nonlinear optical crystal, the sum-frequency mixing efficiency is optimal only if the two lasers reach threshold at precisely the same time. In practice, this task is difficult to achieve, even for two uncoupled lasers, but it becomes particularly so in a coupled system, because intense electrical fields in one oscillating laser rob energy from the fields in the second. Controlling the timing at which two lasers in a coupled system reach threshold is closely related to the problem of controlling jitter in the output of a single Q-switched laser. In both instances, the key to solving the problem lies in controlling the function performed by the nonlinear optical crystal.

SUMMARY OF THE INVENTION

The present invention, a pulsed intracavity nonlinear optical frequency converter, employs a novel technique for precise temporal control of the properties of coherent radiation generated using nonlinear optical techniques within one or more laser oscillators. Various types of nonlinear optical crystals can be incorporated within lasing devices to achieve the improved control of their output energy in accordance with the present invention.

In a first preferred embodiment, a nonlinear optical crystal is placed within Q-switched laser oscillator. The crystal is fabricated with electrodes to which conducting wires are attached, and these wires couple the electrodes to a power supply that is a source of high-voltage electrical power. Ideally, the same high-voltage source used to drive an electro-optical Q-switch can be used to provide the voltage used to control the nonlinear optical crystal. The nonlinear optical crystal functions as a "δ-switch," having a dephasing effect on the energy in the laser's optical cavity that is controlled by the application of high voltage to the electrodes of the crystal.

This laser system progresses through three distinct phases. During a first "pump" phase, both the Q-switch and the δ-switch are "closed." Pump energy is applied to the laser medium, creating a substantial population inversion. During a second "build-up" phase, the Q-switch is opened, while the δ-switch remains closed, allowing the intracavity fluence at the fundamental wavelength to rapidly build up to a threshold. Finally, during an "extraction" phase, the δ-switch is opened, and the intracavity energy, which has built up at the fundamental wavelength, is extracted as energy at a second harmonic of this fundamental wavelength. Both the instant at which the δ-switch is opened and the shape of the high-voltage waveform that is used to control dephasing in the nonlinear optical crystal, i.e., to "open" the δ-switch to emit the output pulse, can be controlled to optimize the time and shape of the output pulse, as necessary to meet the requirements of a particular application.

In a second embodiment, the nonlinear optical crystal is controlled to selectively mix the frequencies of coherent light from a plurality of lasers in a shared internal optical path, such as in a dual ring laser. The application of high voltage to the pair of electrodes on the nonlinear optical crystal controls an interaction between the electrical fields of the coherent light to develop a precisely controlled peak power for the laser output pulse.

Another aspect of the present invention is directed to a method for controlling an output pulse from a laser that includes a Q-switch by selectively controlling a δ-switch. The method comprises steps that are generally consistent with the above description of the δ-switched laser.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1A:
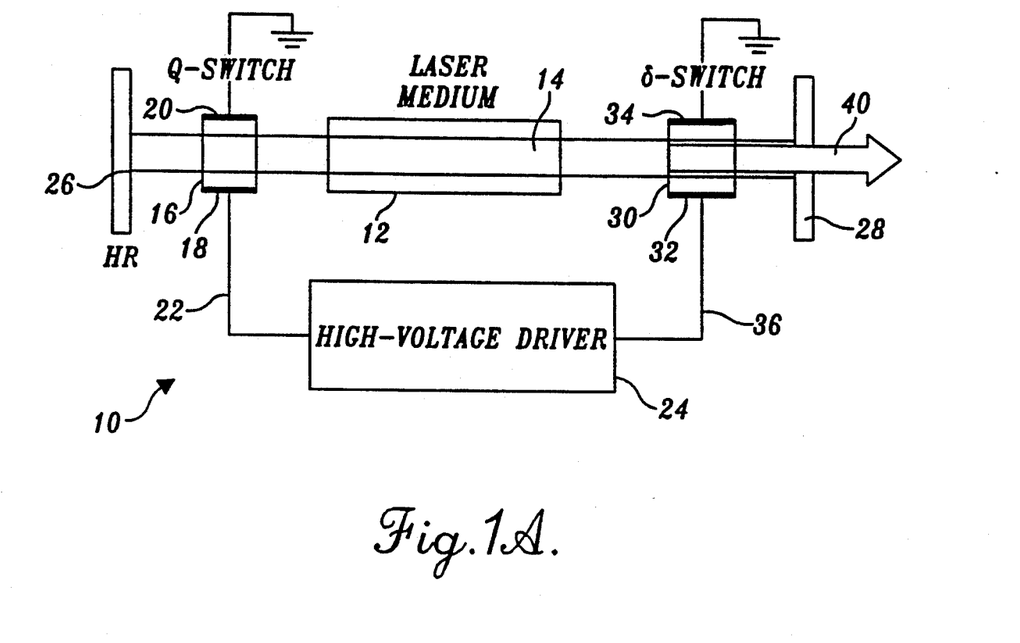
FIG. 1A is a schematic block diagram of a Q-switched laser that incorporates the present invention to control a second harmonic output.

FIG. 1A schematically represents a "δ-switched" SHG laser 10. No attempt is made to show details of the laser such as a flash tube, coolant jacket, frame and mounting supports, etc. that are well known to a person of ordinary skill in the art of laser technology. The elements of laser 10 that are not shown in FIG. 1A are not particularly relevant to the present invention and thus do not need to be discussed further. It is sufficient to describe laser 10 as comprising a generally conventional Q-switched SHG laser system that includes a δ-switch to precisely control the time at which the laser produces an output pulse having a wavelength that is a second harmonic of a fundamental wavelength of the laser.

Laser 10 includes a laser medium 12, which preferably comprises a neodymium:yttrium-aluminum-garnet (Nd:YAG) crystal. Those of ordinary skill in the laser arts will appreciate that other materials could also be employed for use as laser medium 12. An optical cavity 14 extends along the longitudinal axis of laser 10 between a mirror 26 and a mirror 28, both of which have dielectric coatings (not shown) on their facing surfaces that are highly reflective at the fundamental wavelength of the light energy generated as laser medium 12 is excited. A Q-switch 16 controls the build-up of energy in optical cavity 14. An electro-optical type Q-switch is preferred because of its relatively rapid switching speed and because of its simplicity; however, it will be understood that other types of Q-switches might alternatively be used, e.g., an acousto-optical type Q-switch. A high-voltage driver 24 provides the high-voltage signal that controls Q-switch 16.

On the other side of the laser medium within the cavity is disposed a δ-switch 30, which comprises a nonlinear optical crystal. Electrodes 32 and 34 are disposed on opposite surfaces of the nonlinear optical crystal, with electrode 34 coupled to ground potential and electrode 32 coupled to high-voltage driver 24 through a lead 36. In this particular preferred embodiment, the nonlinear optical crystal dephases the light energy in the optical cavity until high voltage is applied to electrodes 32 and 34. Alternatively, a nonlinear optical crystal can be selected having just the opposite electro-optical characteristics, so that the application of voltage to electrodes on the crystal instead causes dephasing of the light energy in the cavity to prevent the second harmonic being generated.

One of the benefits of using an electro-optical type Q-switch 16 instead of another type is that the same high-voltage driver can be used to control the operation of the Q-switch as is used to control the δ-switch. Q-switch 16 includes an electrode 18 on one surface that is coupled to high-voltage driver 24 through a lead 22, and on an opposing surface is disposed a grounded electrode 20 (i.e., grounded with regard to the high voltage driver, but not necessarily at earth ground). High-voltage driver 24 includes circuitry for controlling the rapid application (or removal) of several hundred to several thousand volts to Q-switch 16 and to δ-switch 30 in a precisely timed sequence. The actual voltage level used is determined by characteristics of the Q-switch and δ-switch. Depending upon the electro-optical characteristic of both the Q-switch and of the δ-switch, control of these devices to produce an output pulse can be achieved either by applying the high voltage to each in a precisely timed sequence, or alternatively, by removing it in a timed sequence, and thereby to selectively open and close the switches. The pulse shape and the duration of the high voltage applied to δ-switch 30 is controlled by circuitry in high-voltage driver 24 to achieve a corresponding laser output pulse shape and duration, as will be evident from the explanation that follows.

Those of ordinary skill in the art will appreciate that laser 10 progresses through several distinct phases in producing an output pulse, including a "pump" phase, a "build-up" phase, and an "extraction" phase. During the initial "pump" phase, both the Q-switch and the δ-switch are closed, so that energy in laser medium 12 develops through an increasing inversion population. During the "build-up" phase, the Q-switch is opened and the δ-switch remains closed, while the intracavity fluence traveling contained as a standing wave between mirrors 26 and 28 at the fundamental wavelength builds up to a threshold level. Finally, during the "extraction" phase, the δ-switch is opened, and the intracavity energy at the fundamental wavelength is extracted from optical cavity 14 as energy at the second harmonic of the fundamental wavelength.

δ-Switch Design

Figure 10:
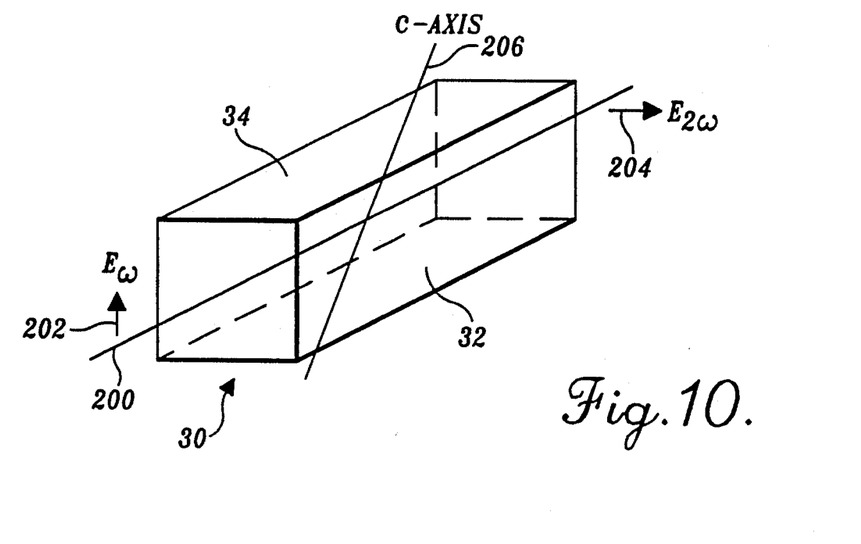
FIG. 10 is a schematic representation of a preferred embodiment of a nonlinear optical crystal used as a δ-switch in the present invention, illustrating the various optical axes of the crystal.

An exemplary schematic representation of δ-switch 30, which preferably comprises a Type I phase-matching nonlinear optical crystal of MgO:LiNbO$_3$, is shown in FIG. 10. In this particular example of a nonlinear optical crystal usable in the frequency converter in accordance with the present invention, a fundamental field $E_\omega$, represented by a vector 202, is transverse to a longitudinal axis 200 of the crystal and polarized in the plane containing both a c-axis 206 and a field propagation vector that extends along longitudinal axis 200. The polarization of a second harmonic wave $E_{2\omega}$, which is represented by a vector 204, is perpendicular to that plane. Electrodes 32 and 34 are applied to the top and bottom surfaces of the crystal shown in FIG. 10, although in principle, they could be applied to any pair of opposite crystal faces. When a high-voltage signal is applied between electrodes 32 and 34, it changes the refractive indices corresponding to these polarizations directed along vectors 202 and 204, causing a change in the dephasing $\delta$ of the crystal that suppresses generation of the second harmonic output signal. Alternatively, as noted above, a nonlinear optical crystal may be selected that has refractive indices responsive to the application of high voltage in the opposite sense, so that application of the voltage to the electrodes enables the generation of the second harmonic.

In principle, suppression of SHG by electro-optically adjusting the refractive indices of the nonlinear optical crystal could have a deleterious side effect. Since the fundamental longitudinal laser frequencies (corresponding to the Fabry-Perot modes of the laser medium) created during the build-up phase are associated with a particular optical path length (OPL) of the resonator, changing that path length could change the oscillation dynamics of the intracavity optical fields at precisely the same instant that the single-pass SHG conversion efficiency of the crystal is increased to its steady-state value. In the worst case, if the OPL is changed by one-half the fundamental wavelength, optical cavity 14 may cease to be a resonator at the existing oscillation frequencies. However, by operating at a low nonlinear optical drive (corresponding to a lower $\delta$-switch voltage) and by using noncritical phase-matching, or by ultimately selecting a nonlinear optical material for the $\delta$-switch that will allow modulation of the refractive index in the polarization direction of the second harmonic alone (along vector 204), this effect can be significantly ameliorated or completely eliminated.

Figure 7:
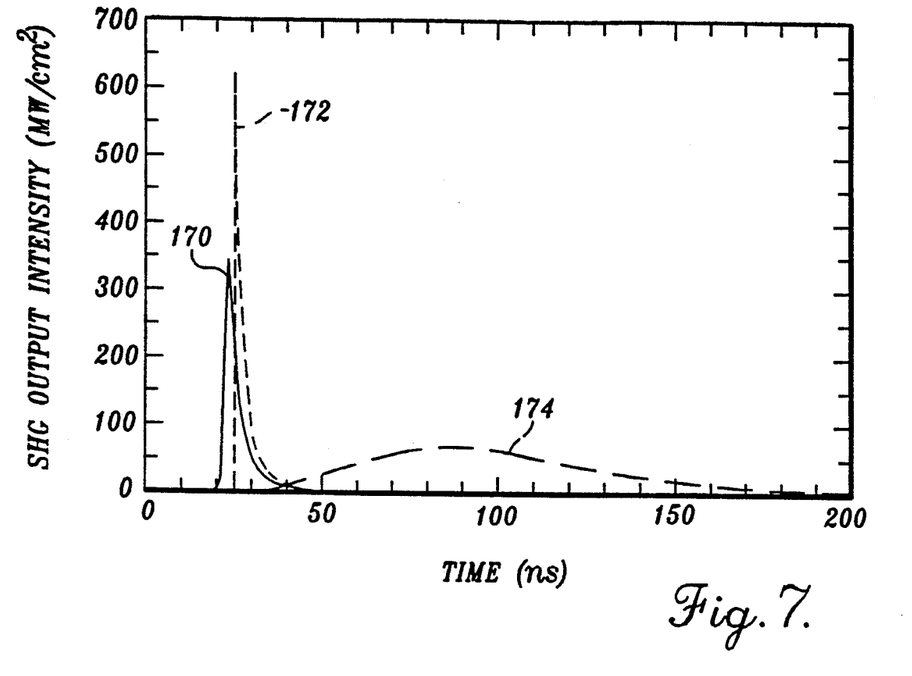
FIG. 7 is a graph showing the second harmonic generation (SHG) output intensity of a δ-switched laser, as a function of the duration of the δ-switching pulse.

Some of the advantages of the $\delta$-switched laser are evident by inspection of FIG. 7. In this Figure, the SHG output intensity of laser 10 as a function of time is illustrated for three different conditions of voltage applied to $\delta$-switch 30. If the $\delta$-switch nonlinear optical crystal is replaced by a Type I, noncritically phase-matched MgO:LiNbO$_3$ frequency doubler crystal, the resulting laser will produce a peak output pulse 170 of about 350 mW/cm$^2$ lasting for about 10 nanoseconds. However, in the laser using $\delta$-switch 30, an SHG output pulse 172 of almost twice the amplitude and one half the pulse width of pulse 170 can be obtained by applying a short ($\sim 5$ ns) high-voltage pulse to electrodes 32 and 34 to open the $\delta$-switch about 25 ns after the Q-switch is opened.

In many medical and industrial applications of laser 10, a longer duration, lower amplitude SHG pulse may be required and can be obtained by extending the duration (about 50 ns) over which the high-voltage pulse is applied to the electrodes of the $\delta$-switch. A stretched pulse 174 is shown as an example of this effect. The energy contained in stretched pulse 174 is only about 25% of that carried by shorter duration output pulse 172, because of the temporal decay of the intracavity energy caused by dissipated losses.

Figure 8:
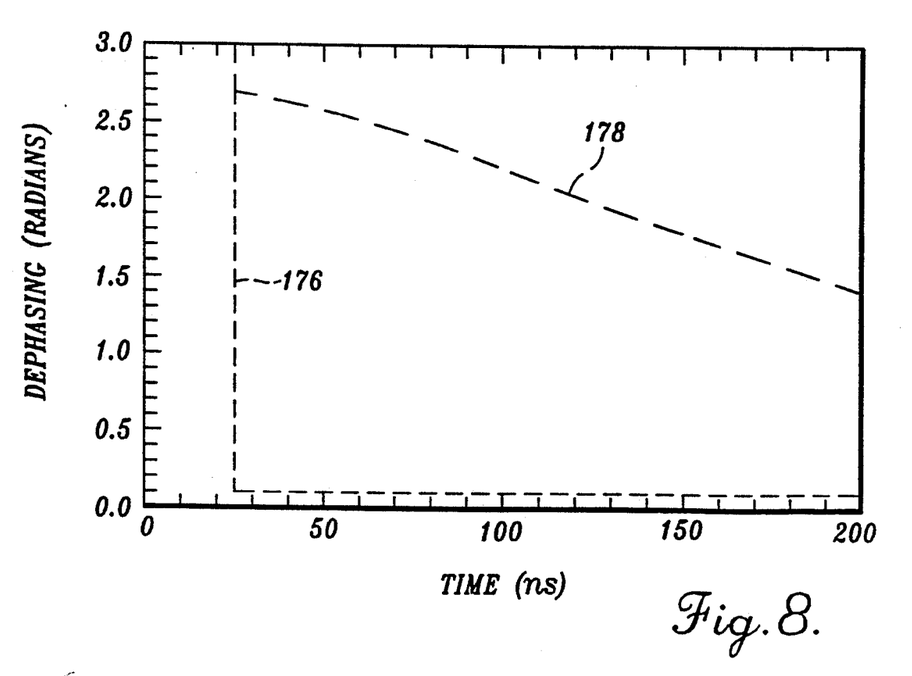
FIG. 8 is a graph illustrating the dephasing produced by a δ-switched laser for relatively short and long switching pulses.

As shown by a short dash line 176 in FIG. 8, shorter duration output pulse 172 is achieved by using $\delta$-switch 30 to dramatically increase the $\delta$ dephasing during the build-up phase to a level that is significantly higher than the noncritically phase-matched value. During this time, the dephasing is so large that the output of the SHG pulse is effectively inhibited. Then at a time $t=25$ ns after the Q-switch is opened, the voltage applied to the electrodes of the $\delta$-switch is cut off, allowing the dephasing to return to its optimum value and the circulating energy to be efficiently extracted at the second harmonic of the fundamental wavelength. For comparison, in FIG. 8, a long dash line 178 illustrates the results of applying greatly stretched pulse 174 of FIG. 7 to the $\delta$-switch. Shaping of the high-voltage pulses applied to the electrodes of $\delta$-switch 30 produces a corresponding temporal pulse-to-pulse shape control of the SHG output pulse, which is very useful in certain applications. The $\delta$-switch can in these cases serve as a variable output coupler.

Figure 9:
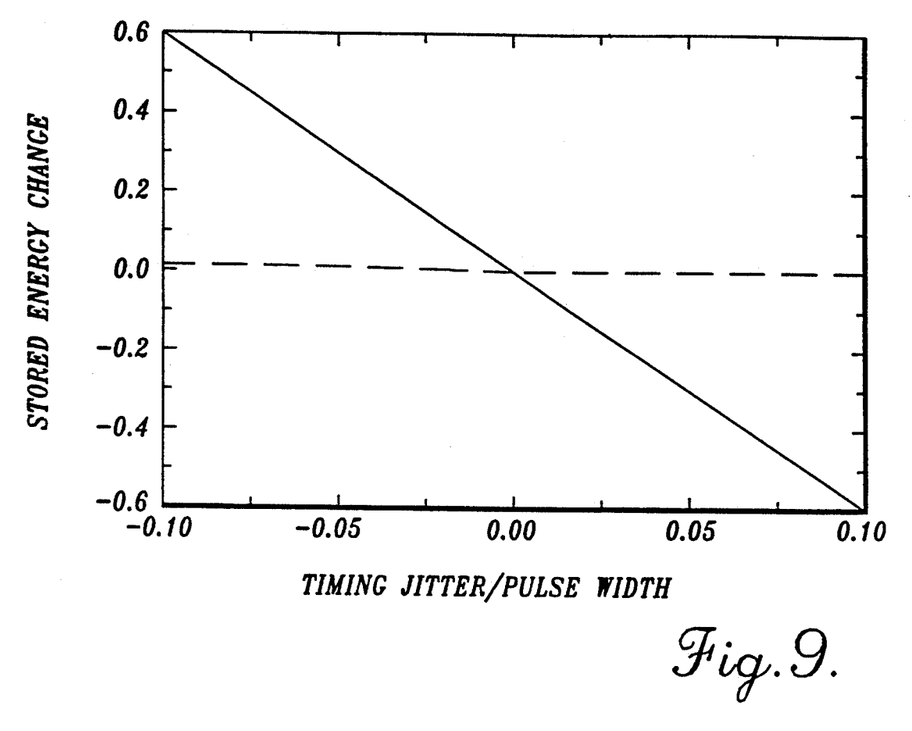
FIG. 9 is a graph showing timing jitter/pulse width with regard to two conditions of the δ-switch (off and short on-pulse)

Another advantage of the $\delta$-switch is illustrated in the graph of FIG. 9. In this graph, the sensitivity of the temporal position of the pulse peak intensity to fluctuations in the initial energy stored in the laser medium is illustrated. This graph shows the pulse-to-pulse timing jitter in units of the Q-switched pulse width caused by fractional changes in the stored pump energy. It should be noted that changes in the amplitude and phase of the initial noise field produce an even larger change in the timing jitter. As indicated by the graph, a relative change of $\pm 10\%$ in the initial stored energy produces a $\pm 60\%$ change in the temporal peak position. However, by employing the $\delta$-switch to control the output pulse, this effect is reduced by more than an order of magnitude. When the change in stored energy is positive, the peak position does not change at all, because the SHG energy extraction cannot begin until after the $\delta$-switch is opened.

Intracavity Sum-Frequency Mixing in a Laser with a Single Q-Switch

In a coupled-cavity sum-frequency-mixed (SFM) laser, two laser resonators operating at distinct fundamental wavelengths are coupled within the volume of a nonlinear optical crystal that is phase-matched to produce output energy at the sum frequency of the two fundamental lasers. The conventional passive optical crystal used for SFM is replaced with an electro-optically controlled birefringent nonlinear optical crystal to produce a frequency converter in accordance with the present invention. Since the dynamics of this system are fairly easy to understand in a laser with a single Q-switch that simultaneously oscillates at two different wavelengths, the operation of this preferred embodiment is discussed first.

Figure 1B:
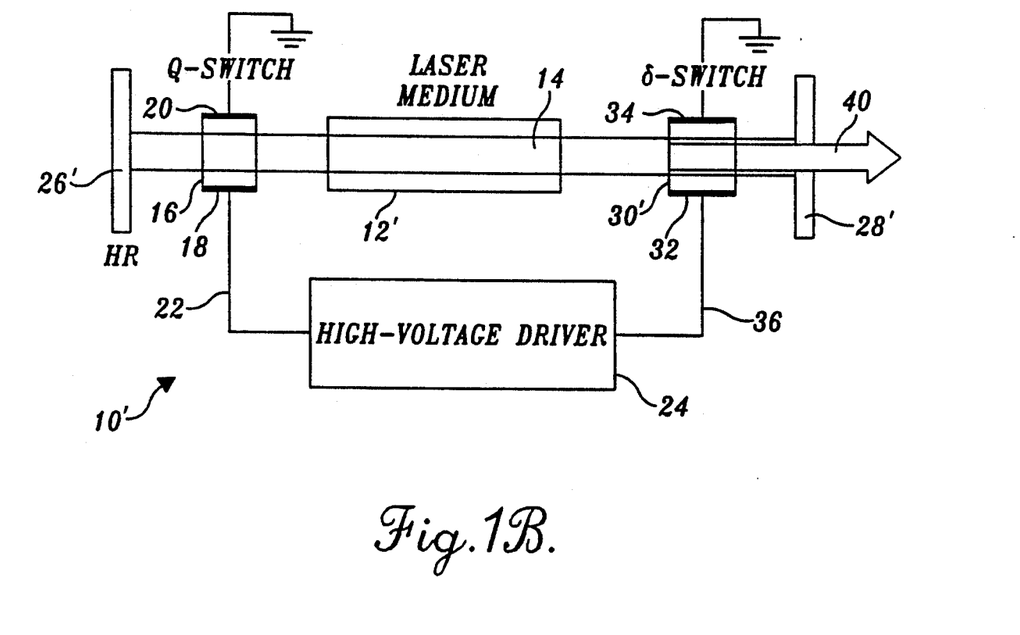
FIG. 1B is a schematic block diagram of a Q-switched laser having dual oscillation frequencies, wherein the present invention is used to selectively control a sum-frequency-mixed output.

Referring to FIG. 1B, a laser 10' is shown that appears very much like laser 10. However, laser 10' include a Nd:YAG laser medium 12' that oscillates at wavelengths of both 1,064 nm and 1,319 nm. In addition, a mirror 26' and a mirror 28' disposed at opposite ends of the optical cavity are both coated with dielectric optical coatings selected to be highly reflective of light at the wavelengths 1,064 nm and 1,319 nm, so that standing waves are contained between the mirrors as the energy builds. In addition, the coating on mirror 28' is highly transmissive to light having a wavelength of 588 nm. The latter wavelength results from sum-frequency mixing of light at the two fundamental wavelengths of laser medium 12', as explained below. In addition, a δ-switch 30' is used that is coated on the face adjacent to laser medium 12' with a coating that is highly transmissive of light at the two fundamental wavelengths, but highly reflective of light of the 588 nm wavelength. The opposite face of the δ-switch is coated to be highly reflective of light at all three of these wavelengths.

All other components of laser 10' are identical to those of laser 10, but its operation is different. Instead of producing a second harmonic wavelength output pulse that is precisely controlled by the voltage applied to the δ-switch, it precisely controlled by the high voltage applied to electrodes 32 and 34, just as in laser 10.

Figure 3:
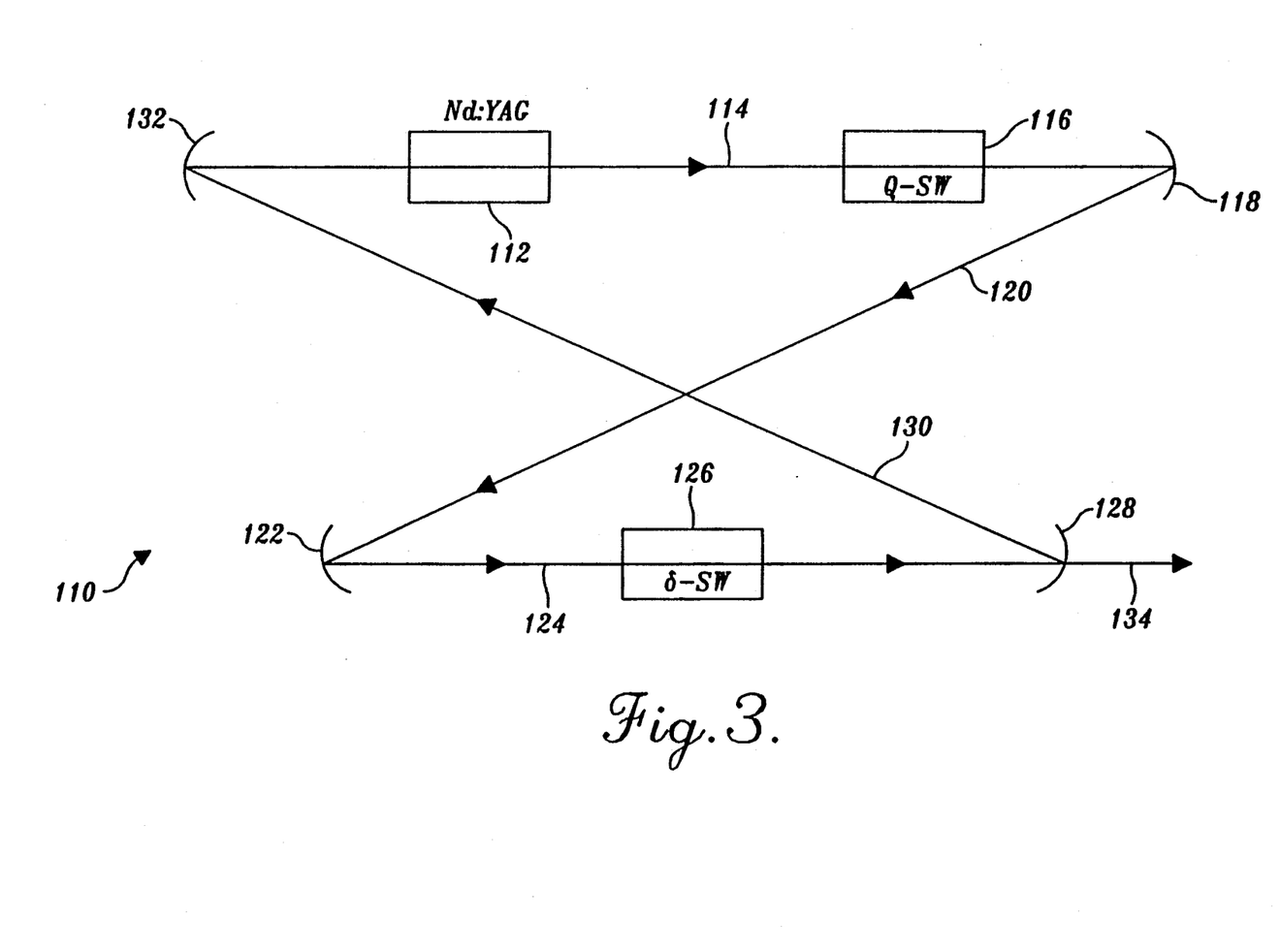
FIG. 3 is a schematic diagram of a ring laser that employs a nonlinear optical crystal to control its output, in accordance with the present invention.

In FIG. 3, a configuration 110 illustrates a single ring resonator wherein intersection of light at two different wavelengths traveling over the entire optical path of the configuration occurs. In this embodiment, a Nd:YAG laser medium 112 oscillates simultaneously at both 1,064 nm and 1,319 nm wavelengths, just as does laser 10' in FIG. 1B. Light at these two frequencies travels along a path 114 through a Q-switch 116 that is open during the build-up phase. (Note that the high-voltage driver is not shown in this and the other embodiments that follow to simplify the drawing.) The light at each frequency is reflected from a mirror 118 coated so that it is highly reflective to both wavelengths, traveling then along a path 120 toward a mirror 122. Mirror 122 is also coated to reflect light at both the 1,064 and 1,319 nm wavelengths along a path 124 through a δ-switch 126. The surface or face of δ-switch 126 through which path 124 enters is coated with a coating that is highly transmissive for light at wavelengths 1,064 nm and 1,319 nm, but highly reflective of light at 588 nm wavelength. The opposite face of δ-switch 126 through which the light at the 1,064 nm and 1,319 nm wavelengths exits during the build-up phase is optically coated so that it is highly transmissive to those two wavelengths and in addition to light at the SFM 588 nm wavelength.

As the energy of the Nd:YAG laser medium builds to its peak level, it is reflected from a mirror 128 along a path 130. Mirror 128 is coated to be highly reflective of light at the two wavelengths being summed but highly transmissive of light at 588 nm. Light traveling along path 130 is reflected from a mirror 132 back to Nd:YAG laser medium 112. As Nd:YAG laser medium 112 reaches its peak level, the voltage applied to δ-switch 126 is changed to modify its optical characteristics so that the SFM of the two resonant wavelengths occurs at the precisely selected time, substantially eliminating jitter and improving the conversion efficiency as light at the 588 nm wavelength is emitted along a path 134 through mirror 128.

Coupled Q-Switched Laser Configurations Controlled Using a δ-Switch

Figure 2:
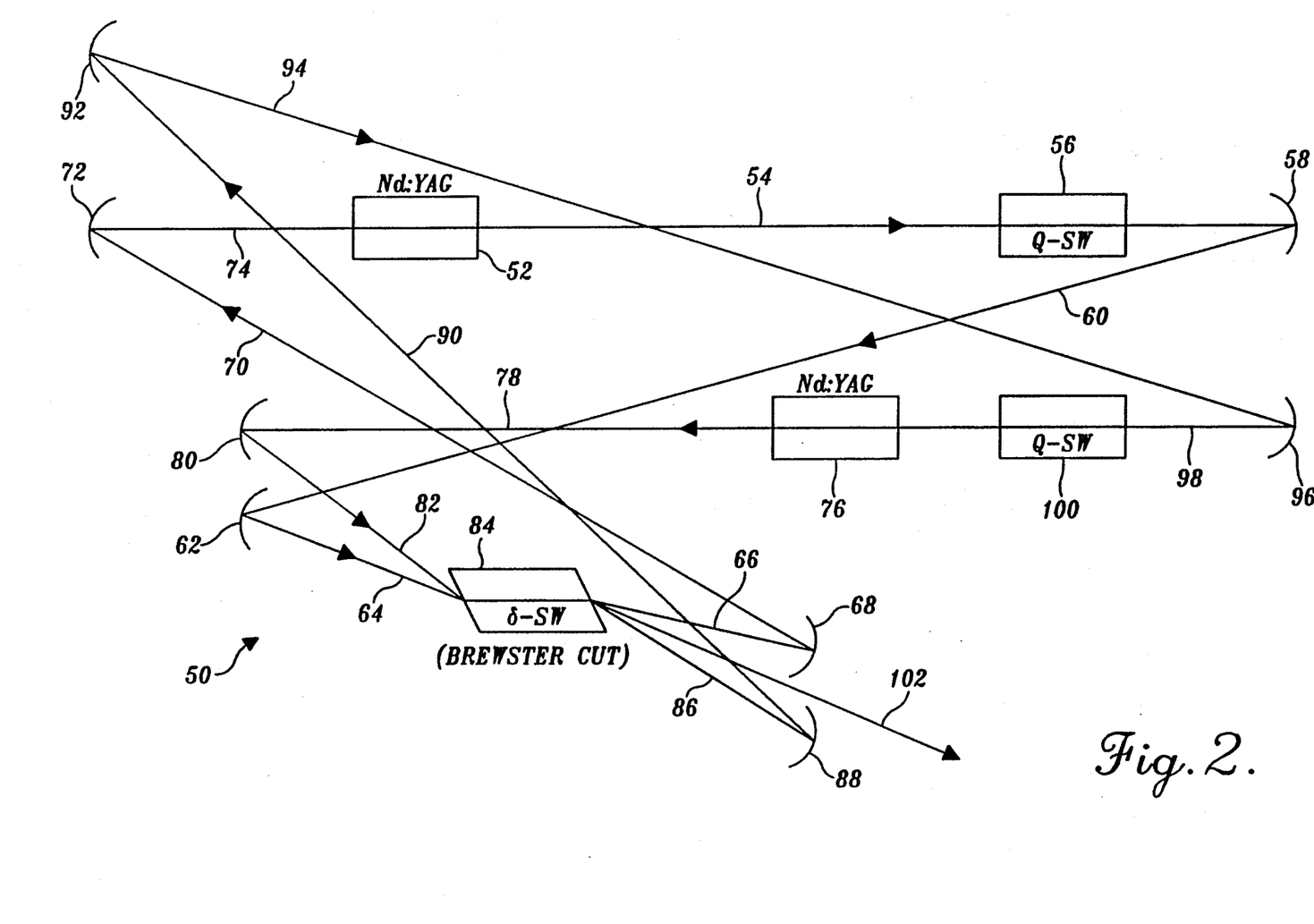
FIG. 2 is a schematic diagram of a dual resonator ring laser, wherein the optical paths of the resonators intersect within a nonlinear optical crystal that controls the sum-frequency mixing of light from each resonator.

FIG. 2 illustrates an intersecting ring laser configuration 50 in w Nd:YAG laser medium 52 excited to produce light having a wavelength of 1,319 nm that traverses a path intersecting with light produced by a Nd:YAG laser medium 76 having a wavelength equal to approximately 1,064 nm. The light from Nd:YAG laser medium 52 is in the form of a traveling wave that propagates along a path 54, through a Q-switch 56, and is reflected from a mirror 58 on which a dielectric coating is applied, so that the mirror is highly reflective at the 1,319 nm wavelength of the light. Light reflected from mirror 58 travels along a path 60 to a mirror 62, which is also coated to be reflective at the wavelength of that light, and then travels along a path 64 and through a δ-switch 84. In this case, δ-switch 84 includes two opposing faces, which are cut at the Brewster angle relative to the longitudinal axis of the nonlinear optical crystal comprising the δ-switch. Until a voltage from the high voltage supply for the Q-switch and δ-switch (not shown) is applied to the electrodes disposed on opposite surfaces of the δ-switch to change its optical characteristics, the light at the 1,319 nm wavelength passes through the nonlinear optical crystal and exits generally along a path 66, toward a mirror 68. Mirror 68 is coated to be highly reflective at the wavelength of this light and reflects the light along a path 70 toward a mirror 72. From mirror 72, which is also coated to be reflective at the 1,319 nm wavelength, the light travels along a path 74, returning to Nd:YAG laser medium 52.

The light emitted from Nd:YAG laser medium 76 propagates in the form of a traveling wave along a path 78 toward a mirror 80 that is optically coated to be highly reflective at the 1,064 nm wavelength of the light, so that the light is reflected along a path 82, which intersects path 64 at δ-switch 84. Thus, light at both the wavelengths 1,064 nm and 1,319 nm intersect and generally share a common path along the longitudinal axis of δ-switch 84. However, because of its wavelength, the light exiting the opposite face of δ-switch 84 travels along a path 86, different than path 66, and is reflected from a mirror 88, which is highly reflective of light having a wavelength of 1,064 nm. From mirror 88, the light is reflected along a path 90 toward a mirror 92, which again reflects it along a path 94 toward a mirror 96. Mirror 96 is coated so that it reflects the light along a path 98 towards a Q-switch 100 through which it passes to return to Nd:YAG laser medium 76.

The advantages of the δ-switch to improve the SFM conversion efficiency in the coupled dual ring lasers shown in FIG. 2 should now be evident. Replacing the conventional SFM crystal normally disposed at the intersection of the two fundamental laser resonators with δ-switch 84 allows the extraction of energy from the system to be held off until the build-up phase of both lasers is completed. Once both Nd:YAG laser media 52 and 76 will have then reached their peak energy level, the voltage applied to δ-switch 84 is changed, to provide the SFM wavelength 588 nm resulting from mixing light at 1,319 nm and 1,064 nm wavelengths. The light at the sum-frequency mixed wavelength is output along a path 102, which is intermediate between paths 66 and 86. Peak output energy is thus achieved because of the precise control over the SFM conversion process exercised by controlling the application of voltage to δ-switch 84.

Figure 4:
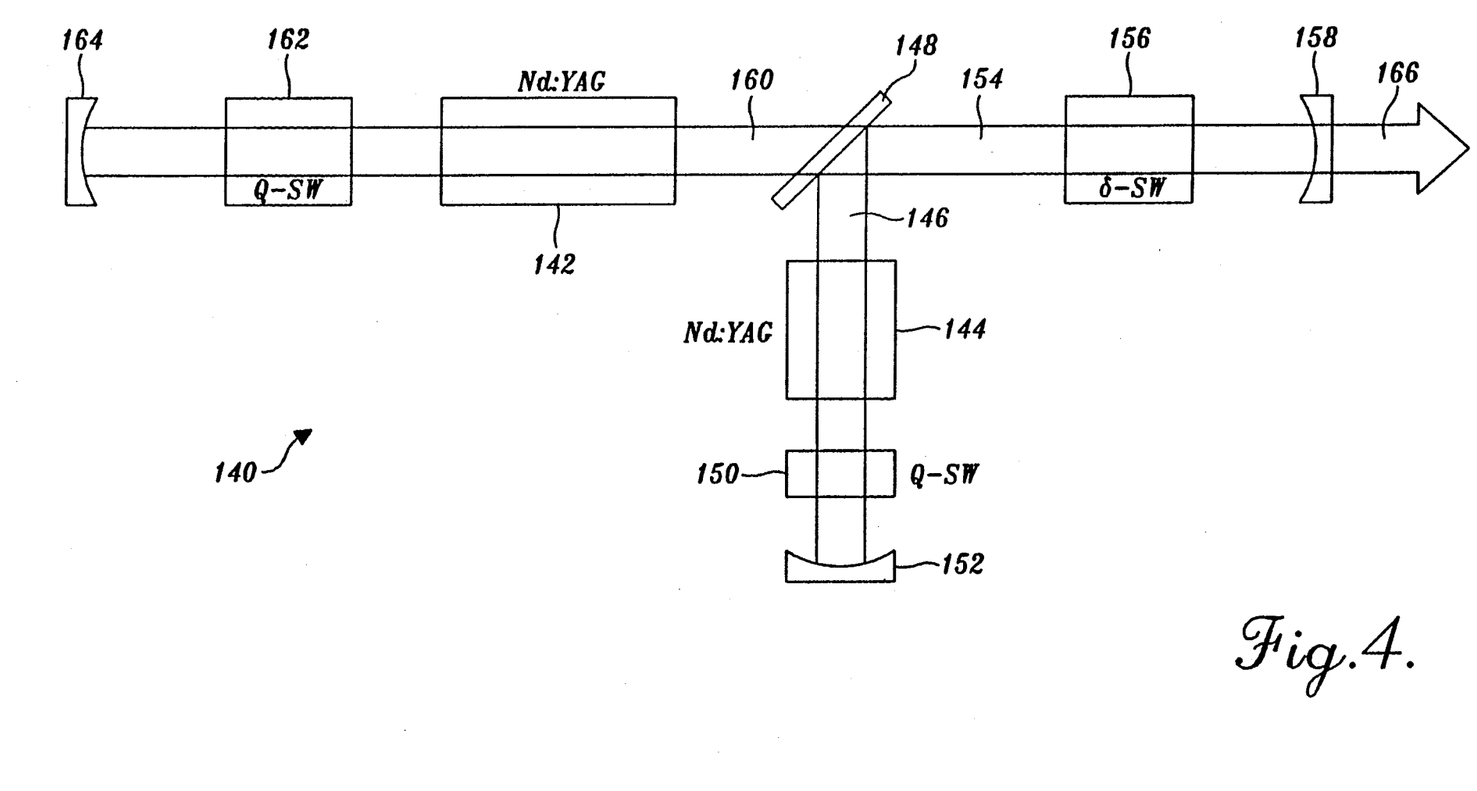
FIG. 4 is an alternative embodiment in which the light energy built up by dual resonators are mixed in a nonlinear crystal that controls an output pulse.

Finally, in FIG. 4, a configuration 140 is illustrated in which light in the form of a standing wave having a wavelength of 1,064 nm produced by Nd:YAG laser medium 142 and light in the form of a standing wave having a wavelength of 1,319 nm produced by Nd:YAG laser medium 144 are combined by SFM conversion in a δ-switch 156 to produce an output signal having a wavelength of 588 nm. In this configuration, a Q-switch 162 is closed during an initial pump phase and open during a build-up phase for Nd:YAG laser medium 142, so that light emitted by the laser passes through Q-switch 162 and is reflected from a mirror 164, coated so that it is highly reflective at the 1,064 nm wavelength of the light. The light energy in Nd:YAG laser medium 142 builds up to a peak, traveling along a path 160 through a mirror 148, which is coated to be highly transmissive for a wavelength of 1,064 nm, but highly reflective for light having a wavelength of 1,319 nm. After passing through mirror 148, the light from Nd:YAG laser medium 142 passes through δ-switch 156 and is reflected back by a mirror 158. Mirror 158 is coated to be highly reflective to light having wavelengths of 1,319 nm and 1,064 nm.

Similarly, the light emitted by Nd:YAG laser medium 144 passes through Q-switch 150 and is reflected from a mirror 152 that is highly reflective of light at the 1,319 nm wavelength. During the build-up phase, the light from Nd:YAG laser medium 144 also reflects from mirror 148 along path 154, passing through δ-switch 156, which is closed at this time. This light then reflects from mirror 158, continuing to build the energy of Nd:YAG laser medium 144.

During the extraction phase, the voltage applied to δ-switch 156 is changed, so that the optical characteristics of the δ-switch are modified to induce SFM, producing an output signal having the 588 nm wavelength. The face of δ-switch 156 adjacent mirror 158 is coated to be highly transmissive at the 588 nm wavelength, while the opposite face is highly reflective at that wavelength. Since mirror 158 is coated to be highly transmissive at 588 nm, an output signal at this wavelength is emitted through mirror 158 along path 166. Again, control of jitter, pulse shape, and peak energy of the output signal are precisely determined by the timing and shape of the voltage applied to δ-switch 156.

Theoretical Discussion

A set of five coupled rate equations describe the fundamental optical fluences (total energy per unit area) stored in linked laser resonators, the total SFM output fluence generated by the system, and the fluences stored in the laser medium as a function of time. The equations governing the behavior of the system are quite complex, but in the special case where each fundamental laser is operating in a single transverse and longitudinal mode, they become:

$$\frac{dJ_1}{dt} = -\frac{J_1}{\tau_1} + \frac{J_4}{J_{1s}\tau_{1c}}\left(J_1 + \frac{hc}{\lambda_1 A}\right) - \frac{\lambda_3}{\lambda_1}\frac{dJ_3}{dt} \quad (1)$$

$$\frac{dJ_2}{dt} = -\frac{J_2}{\tau_1} + \frac{J_5}{J_{2s}\tau_{2c}}\left(J_2 + \frac{hc}{\lambda_2 A}\right) - \frac{\lambda_3}{\lambda_2}\frac{dJ_3}{dt} \quad (2)$$

$$\frac{dJ_3}{dt} = \eta_{SFM}\left(\frac{J_1}{\tau_{1c}} + \frac{J_2}{\tau_{2c}}\right) \quad (3)$$

$$\frac{dJ_4}{dt} = -\frac{J_4}{\tau_4} + \frac{J_4 J_1}{J_{1s}\tau_{1c}} \quad (4)$$

$$\frac{dJ_5}{dt} = -\frac{J_5}{t_5} + \frac{J_5 J_1}{J_{2s}t_{2c}} \quad (5)$$

Here $\lambda_1$ and $\lambda_{12}$ are the fundamental wavelengths. The SFM output wavelength is defined using the expression $1/\lambda_3 = 1/\lambda_1 + 1/\lambda_2$; $J_1$, $J_2$, and $J_3$ are defined as the total fluences at wavelengths $\lambda_1$, $\lambda_2$, and $\lambda_3$, respectively; $J_{1s}$ and $J_{2s}$ represent the saturation fluences of the two laser media at wave-lengths $\lambda_1$ and $\lambda_2$, respectively; $\tau_1$ and $\tau_2$ are the energy storage lifetimes (i.e., the "photon lifetimes") of the fundamental resonators; $\tau_{1c}$ and $\tau_{2c}$ are the round-trip times of the fundamental resonators; $J_4$ and $J_5$ are the stored fluences (i.e., the population inversions in units of energy per-unit area) in the two laser media, respectively; and $\tau_4$ and $\tau_5$ are the upper level lifetimes of the two laser media, respectively.

The SFM conversion efficiency $\eta_{SFM}$ is given by:

$$\eta_{SFM} = \eta_{max} sn^2\left[\sqrt{\eta_0/\eta_{max}}, (\gamma\eta_{max})^2\right] \quad (6)$$

where the maximum conversion efficiency is defined as:

$$\eta_{max} = \frac{1}{\kappa + \sqrt{\kappa^2 - \gamma^2}} \quad (7)$$

The constants $\kappa$ and $\gamma$ may be computed using the expressions:

$$\kappa = \frac{1}{2}\left[\frac{(I_1 + I_2)(\Lambda I_1 + I_2)}{(1 + \Lambda)I_1 I_2} + \frac{\delta^2}{\eta_0}\right] \quad (8)$$

$$\gamma = \left(\frac{\Lambda(I_1 + I_2)^2}{(1 + \Lambda)^2 I_1 I_2}\right)^{\frac{1}{2}} \quad (9)$$

where $\Lambda \equiv \lambda_1/\lambda_2$ is the ratio of the fundamental wavelengths. The drive and the dephasing are respectively defined for a nonlinear optical crystal of length L as:

$$\eta_0 = (1 + \Lambda)^2 (CL)^2 \frac{I_1 I_2}{I_1 + I_2} \quad (10)$$

$$\delta = \frac{1}{2}\Delta k L \quad (11)$$

The coupling constant C is defined in terms of the effective nonlinear optical coefficient $d_{eff}$ as:

$$C = 2\pi\sqrt{\frac{2}{\epsilon_0 c}}\frac{d_{eff}}{\lambda_1 \sqrt{\eta_1 \eta_2 \eta_3}} \quad (12)$$

where $\eta_1$, $\eta_2$, and $\eta_3$ are the refractive indices at wavelengths $\lambda_1$, $\lambda_2$, and $\lambda_3$. The wave-vector mismatch is defined by the familiar relation:

$$\Delta k = k_3 - k_1 - k_2 = \frac{2\pi}{\lambda_1}[(1 + \Lambda)\eta_3 - \Lambda\eta_2 - \eta_1] \quad (13)$$

Figure 5:
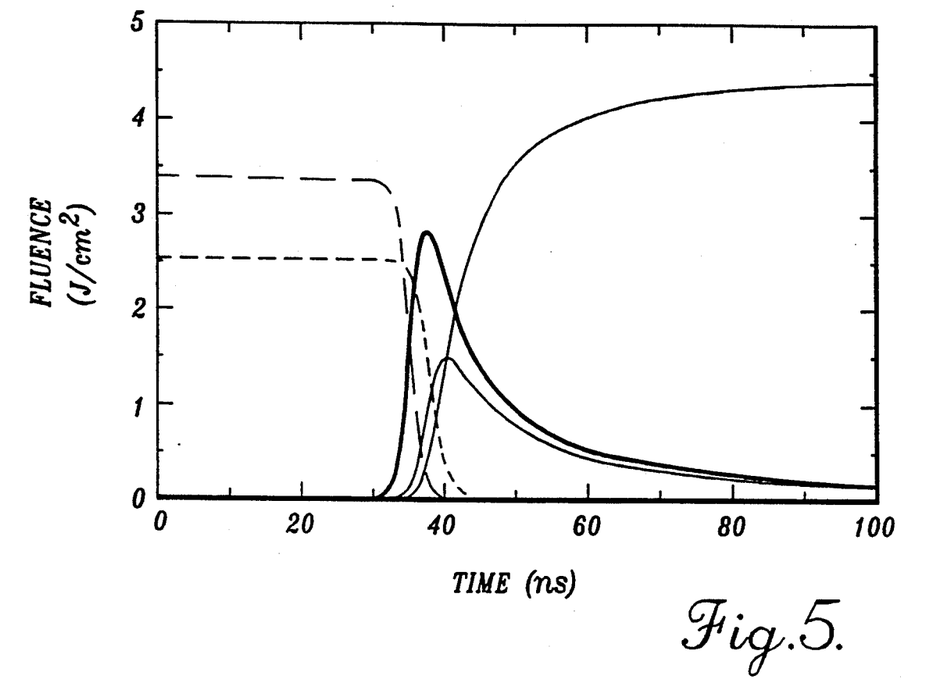
FIG. 5 is a graph showing the timing relationship between the energy built up in coupled Nd:YAG and Ti:Sapphire ring lasers, and their output fluence.

When these rate equations are applied to a coupled Nd:YAG/Ti:Sapphire laser system designed to produce laser light at 455 nm using Type I critical phase-matching in KD*P, the result shown in FIG. 5 are obtained. The round-trip dissipative loss in each laser resonator was assumed to be 5%. Note that the total stored fluence of 6 J/cm$^2$ at 1064 and 796 nm is converted to 455 nm with an efficiency of 75%, even though a crystal length in the illustrated example was only 0.25 cm. This high efficiency is the hallmark of intracavity SFM: Since the light that is not converted during a particular pass through the crystal is recirculated during the next pass, single-pass conversion efficiencies of only a few percent are sufficient to provide high overall extraction efficiencies.

Figure 6:
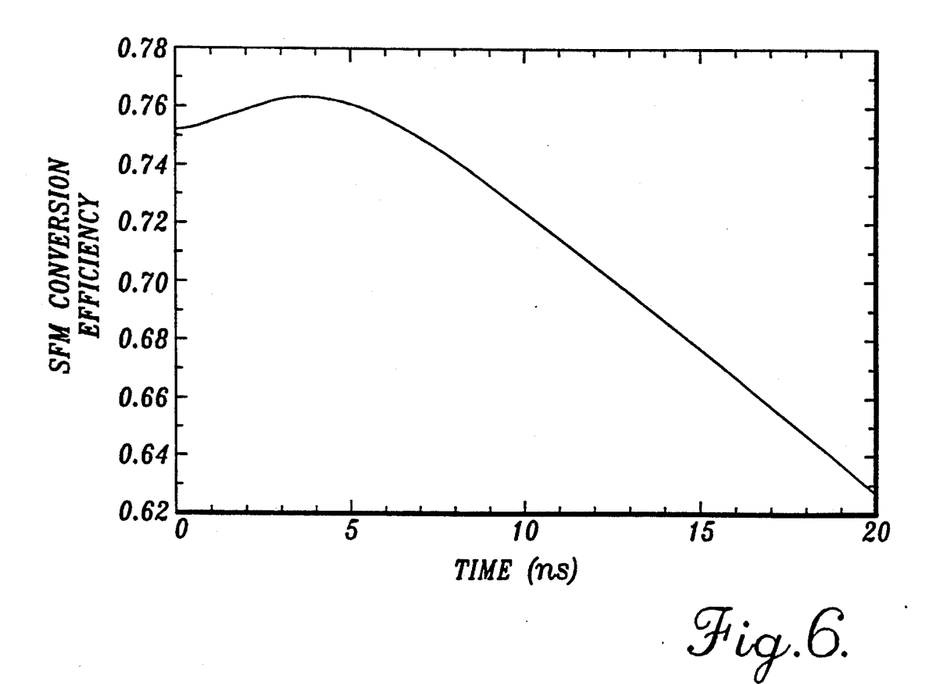
FIG. 6 is a graph showing the frequency mixing conversion efficiency for a coupled Nd:YAG/Ti:Sapphire laser system as a function of the relative Q-switch delay time for the lasers.

However, this system is quite sensitive to small fluctuations in the energies stored in the laser media and to small fluctuations in the relative Q-switch delay between the two systems. As an example, FIG. 6 summarizes the results of many simulations similar to the one shown in FIG. 5. In the particular set of simulations that produced the results shown in FIG. 6, the relative Q-switch delay was varied, although allowing the stored energies to fluctuate would have produced a similar result. Note that as the delay changes by substantially less than the duration of either of the two pulses, the SFM conversion efficiency decreases drastically. This reduction of SFM conversion efficiency occurs largely because of increased loss for the field that reaches threshold last, due to the nonlinear interaction with the larger field during the weaker field's build-up phase.

If the conventional SFM crystal at the intersection of the two fundamental laser resonators is replaced with a δ-switch, the extraction phase can be held off until both fundamental lasers complete the build-up phase. Hence, the sensitivity of the second harmonic generation efficiency to timing jitter would be dramatically reduced.

Intracavity Second Harmonic Generation

In the case of second harmonic generation, the two fundamental input fields have the same frequency, but they are contained within the same resonator. When Type II phase-matching is used, the same basic set of equations that describe sum frequency mixing can be used, but as shown by Baer (J. Opt. Soc. Am. B 3, 1175 (1986)) and by Oka and Kubota (Opt. Lett. 13, 805 (1988)), there are in principle, terms that reflect temporal instabilities that correspond to interference between polarization eigenmodes of the laser system. These can be significantly reduced by including a quarter-wave plate (at the fundamental frequency) within the resonator. For Type I phase-matching, both fundamental waves are in fact the same field, so the five rate equations listed above can be reduced to a much simpler set of three equations.

Effects similar to those described in the previous section occur in the special case of second harmonic generation as well, although somewhat more subtly. In a conventional intracavity SHG laser, the fundamental input fields are always perfectly coordinated, since they originate from the same beam. However, any spatial or temporal fluctuations in the fundamental field are exaggerated by the nonlinear SHG process. For example, considerable pulse-to-pulse jitter in the temporal position of the second harmonic output field results from fluctuations in the pump energy stored in the laser medium, and in the precise amplitude and phase of the noise field resonator when the Q-switch is opened. These initial conditions are virtually impossible to control in a Q-switched laser system, so the resolution of field remote-sensing and optical communication systems is often quite limited by these effects.

Those of ordinary skill in the art will appreciate that other configurations for providing SHG and SFM controlled by a δ-switch in accordance with the present invention can readily be achieved. Accordingly, it is not intended that the disclosure of the preferred embodiments and modifications thereto in any way limit the scope of the claims that follow. Instead, the scope of the invention should be determined entirely by reference to the claims.

The embodiments of the invention in which an exclusive property or privilege is claimed are defined as follows:

1. An optical switch for controlling a converted frequency output pulse from a Q-switched laser oscillator, comprising:
  (a) a birefringent nonlinear optical crystal adapted for installation in an optical cavity of a Q-switched laser oscillator, said optical crystal having a plurality of opposed surfaces and a pair of electrodes applied to two opposed surfaces to control at least one refractive index of the optical crystal for light entering through one of the plurality of opposed surfaces, as a function of a voltage applied to the electrodes;
  (b) a voltage source coupled to the pair of electrodes on the birefringent nonlinear optical crystal; and
  (c) control means coupled to the voltage source, for controlling a voltage applied to the pair of electrodes to cause a change in a converted frequency transmission characteristic of the birefringent nonlinear optical crystal at a predefined time after activation of a Q-switch, when energy in the optical cavity of a Q-switched laser has built up to a threshold level, said change in the converted frequency transmission characteristic enabling a pulse of converted frequency coherent light to be transmitted from said optical crystal as a laser output pulse.

2. The optical switch of claim 1, wherein application of said voltage to the pair of electrodes causes a second harmonic of a coherent light energy within a cavity in which the birefringent nonlinear optical crystal is disposed, to be produced within said optical crystal.

3. The optical switch of claim 1, wherein removal of said voltage from the pair of electrodes causes a second harmonic of a coherent light energy within a cavity in which the birefringent nonlinear optical crystal is disposed, to be produced within said optical crystal.

4. The optical switch of claim 1, wherein said control means shape a time varying amplitude of the voltage applied to the pair of electrodes to determine the shape and duration of the laser output pulse.

5. The optical switch of claim 1, wherein the birefringent nonlinear optical crystal has a primary optical axis, and said primary optical axis is disposed at a predefined angle relative to a longitudinal axis of an optical cavity in which said optical crystal is disposed.

6. The optical switch of claim 1, wherein the birefringent nonlinear optical crystal is disposed in an optical cavity of a Q-switched laser oscillator that produces coherent light at a plurality of frequencies, and wherein said optical crystal mixes the plurality of frequencies of coherent light in the optical cavity, the voltage applied to the pair of electrodes on said optical crystal controls controlling an interaction between electrical fields of the coherent light mixed in the birefringent nonlinear optical crystal so as to develop a peak power for the laser output pulse.

7. The optical switch of claim 1, wherein the Q-switched laser oscillator containing coherent light in a traveling wave, said birefringent nonlinear optical crystal producing a second harmonic of a coherent light energy at a frequency within the cavity in which said optical crystal is disposed, in response to the voltage applied to the pair of electrodes, said second harmonic of the frequency of coherent light energy being emitted as the laser output pulse.

8. The optical switch of claim 1, wherein a plurality of Q-switched laser oscillators have separate optical cavities that are congruent at a point where the birefringent nonlinear optical crystal is disposed, and wherein said optical crystal mixes frequencies of coherent light from the plurality of lasers, the voltage applied to the pair of electrodes on said optical crystal controls controlling an interaction between electrical fields of the coherent light mixed in the birefringent nonlinear optical crystal so as to develop a peak power for the laser output pulse.

9. A method for controlling an output pulse from a laser oscillator that includes a laser medium and a Q-switch, comprising the steps of:
 (a) mounting a birefringent nonlinear optical crystal in a resonator of the laser oscillator;
 (b) controlling the application of a voltage to a pair of electrodes on the birefringent nonlinear optical crystal so as to affect a converted frequency characteristic of said optical crystal;
 (c) with the Q-switch closed, pumping the laser medium to a higher energy state;
 (d) opening the Q-switch; and
 (e) changing the voltage applied to the pair of electrodes at a predefined interval of time after the Q-switch is closed, to cause a change in the optical characteristic of the birefringent nonlinear optical crystal, said change enabling a pulse of converted frequency coherent light to be transmitted from said optical crystal as a laser output pulse.

10. The method of claim 9, wherein the step of changing the voltage applied to the pair of electrodes comprises the step of applying a voltage to the electrodes, application of said voltage causing a second harmonic of a coherent light energy within a cavity in which the birefringent nonlinear optical crystal is disposed, to be produced within said optical crystal.

11. The method of claim 9, wherein the step of changing the voltage applied to the pair of electrodes comprises the step of removing a voltage from the electrodes, removal of said voltage causing a second harmonic of a coherent light energy within a cavity in which the birefringent nonlinear optical crystal is disposed, to be produced within said optical crystal.

12. The method of claim 9, further comprising the step of shaping a time varying amplitude of the voltage applied to the pair of electrodes, and thereby determining a shape and duration of the laser output pulse.

13. The method of claim 9, wherein the step of mounting the birefringent nonlinear optical crystal comprises the step of orienting said optical crystal so that a primary optical axis of said optical crystal is at a predefined angle relative to a longitudinal axis of a cavity in which said optical crystal is disposed.

14. The method of claim 9, wherein for a plurality of Q-switched lasers having separate resonator paths, at least a portion of the resonator paths being congruent, the step of mounting comprises the step of mounting the birefringent nonlinear optical crystal in said portion of the resonators paths so that it is shared and common to the plurality of Q-switched lasers, further comprising the steps of:
 (a) generating coherent light in the plurality of Q-switched lasers, said coherent light having a plurality of frequencies;
 (b) controlling an interaction of electrical fields of the coherent light with the voltage applied to the pair of electrodes; and
 (c) developing a peak power for the pulse of converted frequency coherent light transmitted from said optical crystal.

15. The method of claim 9, wherein the Q-switched laser contains coherent light energy in a traveling wave, said step of changing the voltage that is applied to the pair of electrodes controlling the production of a second harmonic of the coherent light energy, said second harmonic of said energy comprising the laser output pulse transmitted from said optical crystal.

16. The method of claim 9, further comprising the steps of:
 (a) using the Q-switched laser to generate coherent light at a plurality of frequencies;
 (b) controlling an interaction of electrical fields of the coherent light at the plurality of frequencies with the voltage applied to the pair of electrodes; and
 (c) developing a peak power for the pulse of converted frequency coherent light transmitted from said optical crystal.

* * * * *

UNITED STATES PATENT AND TRADEMARK OFFICE
CERTIFICATE OF CORRECTION

PATENT NO. : 5,321,709
DATED : June 14, 1994
INVENTOR(S) : Raymond G. Beausoleil It is certified that error appears in the above-indentified patent and that said Letters Patent is hereby corrected as shown below:

Column 2, line 16, After "within" insert —a—.

Column 6, line 36, "at all" should be italicized.

Column 6, line 37, "after" should be italicized.

Column 7, line 13, after "it" insert —produces an output pulse at the sum-frequency wavelength of the laser, i.e., at the 588 nm wavelength. The timing of this output pulse relative to the $Q$-switch is—

Column 7, line 59, delete "w" and insert therefor —which a—.

Signed and Sealed this

Fourth Day of October, 1994

Attest:

BRUCE LEHMAN

Attesting Officer

Commissioner of Patents and Trademarks